(12) United States Patent
Shin

(10) Patent No.: US 10,747,462 B2
(45) Date of Patent: Aug. 18, 2020

(54) DATA PROCESSING SYSTEM AND OPERATING METHOD THEREOF

(71) Applicant: SK hynix Inc., Gyeonggi-do (KR)

(72) Inventor: Soong Sun Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 221 days.

(21) Appl. No.: 15/210,704

(22) Filed: Jul. 14, 2016

(65) Prior Publication Data

US 2017/0277473 A1    Sep. 28, 2017

(30) Foreign Application Priority Data

Mar. 24, 2016   (KR) .......................... 10-2016-0035043

(51) Int. Cl.
*G06F 3/06* (2006.01)
*G06F 13/28* (2006.01)

(52) U.S. Cl.
CPC ............ *G06F 3/0647* (2013.01); *G06F 3/061* (2013.01); *G06F 3/0619* (2013.01); *G06F 3/0656* (2013.01); *G06F 3/0679* (2013.01); *G06F 3/0685* (2013.01); *G06F 13/28* (2013.01)

(58) Field of Classification Search
CPC ..... G06F 3/0647; G06F 3/0619; G06F 3/0685
See application file for complete search history.

(56) References Cited

U.S. PATENT DOCUMENTS

| 2008/0301379 | A1* | 12/2008 | Pong | ................... | G06F 12/0284 |
| | | | | | 711/148 |
| 2010/0169553 | A1* | 7/2010 | Yano | ................... | G06F 12/0246 |
| | | | | | 711/103 |
| 2011/0167222 | A1* | 7/2011 | Lee | ........................ | G06F 9/3004 |
| | | | | | 711/118 |
| 2012/0265925 | A1* | 10/2012 | Miura | ................. | G06F 12/0246 |
| | | | | | 711/103 |
| 2013/0111145 | A1* | 5/2013 | Ish | ......................... | G06F 12/08 |
| | | | | | 711/135 |
| 2013/0166820 | A1* | 6/2013 | Batwara | .............. | G06F 12/0246 |
| | | | | | 711/103 |
| 2014/0219034 | A1* | 8/2014 | Gomez | ................... | G11C 16/06 |
| | | | | | 365/185.22 |
| 2015/0356020 | A1* | 12/2015 | Desai | .................. | G06F 12/0897 |
| | | | | | 711/103 |

FOREIGN PATENT DOCUMENTS

| KR | 1020090102192 | 9/2009 |
| KR | 1020150074550 | 7/2015 |

* cited by examiner

*Primary Examiner* — Baboucarr Faal
*Assistant Examiner* — Jane Wei
(74) *Attorney, Agent, or Firm* — IP & T Group LLP

(57) ABSTRACT

A data processing system includes a host device including a first volatile memory which includes an exclusive region and a shared region, and a first control unit; and a data storage device including a second control unit, and configured to store data to be accessed by the host device, wherein the first control unit adds a header information including an identification information and a state information, to data to be stored in the data storage device, and stores the data added with the header information, in the shared region, according to a request of the second control unit.

12 Claims, 8 Drawing Sheets

DATA PROCESSING SYSTEM AND OPERATING METHOD THEREOF

CROSS-REFERENCES TO RELATED APPLICATION

The present application claims priority under 35 U.S.C. § 119(a) to Korean application number 10-2016-0035043, filed on Mar. 24, 2016, in the Korean Intellectual Property Office, which is incorporated herein by reference in its entirety.

BACKGROUND

1. Technical Field

Various embodiments relate to a data processing system including a data storage device which uses a nonvolatile, memory device as a storage medium, and an operating method thereof.

2. Related Art

Recently, the paradigm for the computer environment has shifted into ubiquitous computing so that computer systems can be used anytime and anywhere. Due to this, use of portable electronic devices, such as, for example, mobile phones, digital cameras, and notebook computers has rapidly increased. In general, a portable electronic device employs a data storage device which includes one or more memory devices for storing data to be used in the portable electronic device.

A data storage device using a memory device provides advantages in that, generally, since there is no mechanical driving part, stability and durability are excellent, information access speed is high and power consumption is small. Data storage devices having such advantages include universal serial bus (USB) memory devices, memory cards having various interfaces, and solid state drives (SSD).

SUMMARY

Various embodiments are directed to a data storage device capable of sharing a volatile memory device with a host device, and an operating method thereof.

In an embodiment, a data processing system may include: a host device including a first volatile memory which includes an exclusive region and a shared region, and a first control unit; and a data storage device including a second control unit, and configured to store data to be accessed by the host device, wherein the first control unit adds a header information including an identification information and a state information, to data to be stored in the data storage device, and stores the data added with the header information, in the shared region, according to a request of the second control unit.

In an embodiment, there may be provided a method for operating a data processing system including a host device which includes a first volatile memory including an exclusive region and a shared region and a first control unit, and a data storage device which includes a second volatile memory, a nonvolatile memory device including a buffer region and a main region and a second control unit, wherein the first control unit adds a header information including an identification information and a state information, to data to be stored in the data storage device, and stores the data added with the header information, in the shared region, according to a request of the second control unit, and wherein, based on the state information, the second control unit moves the data stored in the shared region, from the shared region to the buffer region or from the shared region to the main region.

According to the embodiments, the data storage device may operate with an expanded memory space of the volatile memory device, and thus the performance of the data storage device may be improved.

DETAILED DESCRIPTION

Figure 1:
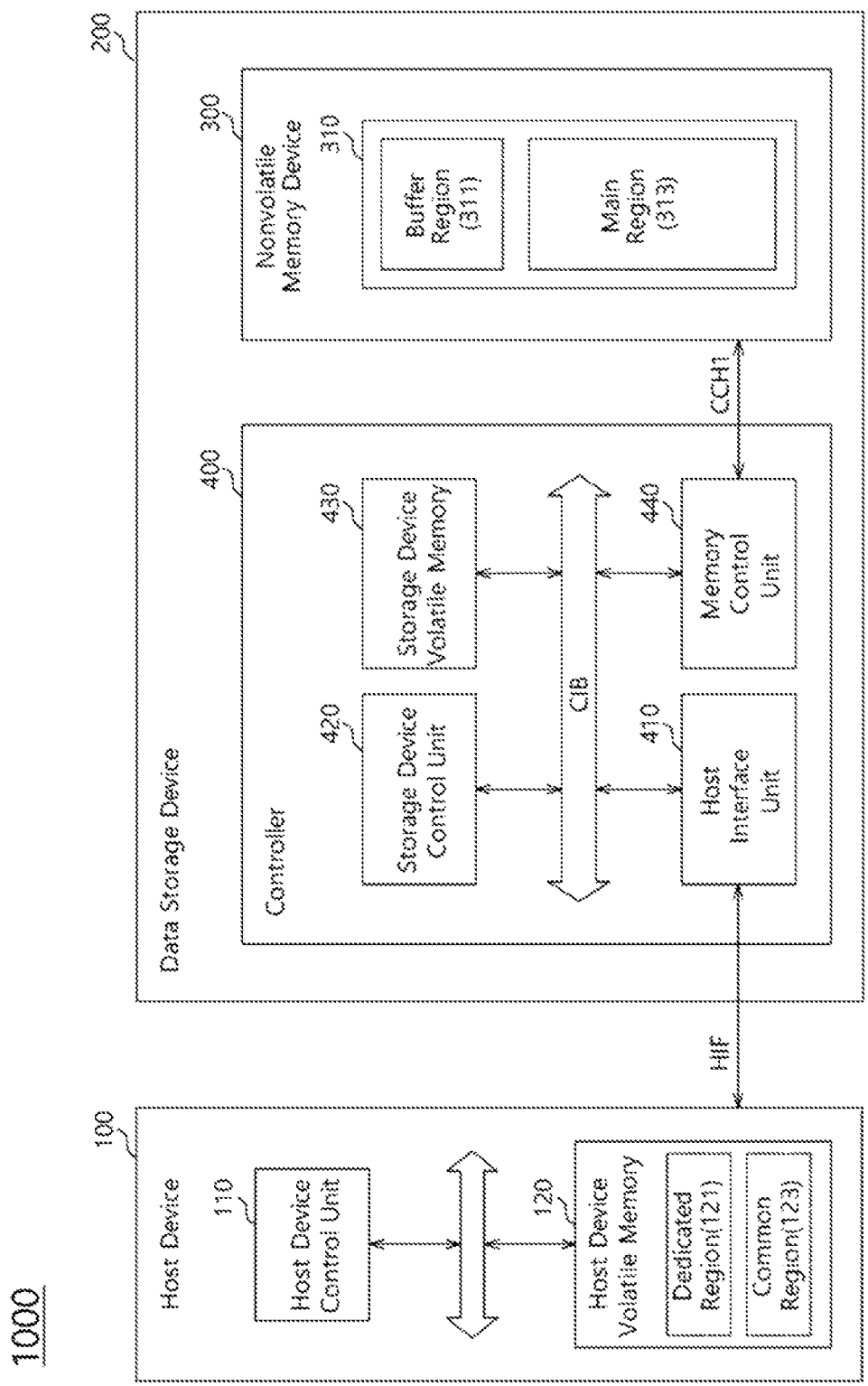
FIG. 1 is a block diagram illustrating a data processing system, according to an embodiment of the present invention.

In the present invention, advantages, features and methods for achieving them will become more apparent after a reading of the following embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can practice the present invention.

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be also understood that when an element is referred to as being "on," "connected to" or "coupled to" another element, it may be directly on, connected or coupled to the other element or intervening elements may be present. As used herein a singular form is intended to include plural forms as well, unless the context clearly indicates otherwise. It will be further understood that the terms "includes,"

"comprises," "including" "comprising," and the like, when used in this specification, are open ended terms that specify the presence of at least one stated element, but do not preclude the presence or addition of one or more other elements.

Hereinafter, various embodiments of the present invention, including a data processing system and an operating method thereof will be described below with reference to the accompanying drawings.

FIG. 1 illustrates a data processing system 1000 according to an embodiment of the invention.

According to the embodiment of FIG. 1, the data processing system 1000 may include a host device 100 and a data storage device 200 operatively coupled to each other. The host device 100 may be or include portable electronic devices, such as, for example a mobile phone, an MP3 player and a laptop computer and electronic devices, such as, for example, a desktop computer, a game player, a TV and an in-vehicle infotainment system.

The host device 100 may include a host device control unit 110 and a host device volatile memory 120. The host device volatile memory 120 will be referred to as a host memory 120. While FIG. 1 exemplifies the host memory 120 outside the host device control unit 110, it is to be noted that the host memory 120 may be included in the host device control unit 110.

The host device control unit 110 may control one or more of the general operations of the host device 100. The host device control unit 110 may control all of the general operations of the host device 100. For example, the host device control unit 110 may drive an instruction, such as, for example, an algorithm of a code type, (e.g., a software) loaded in a dedicated region 121 of the host memory 120, and may control one or more of the operations of various function blocks in the host device 100. The host device control unit 110 may, for example, be configured by a micro control unit (MCU), and/or a central processing unit (CPU).

The host memory 120 may store a software to be driven by the host device control unit 110. The host memory 120 may store data necessary for driving of the software. That is to say, the host memory 120 may operate as the working memory of the host device control unit 110. The host memory 120 may be configured by a random access memory, such as, for example, a DRAM or an SRAM. The host memory 120 may be divided into the dedicated region 121 and a common region 123. The dedicated region 121 is dedicated to the host device control unit 110 meaning that the dedicated region 121 may be accessed or used only by the host device control unit 110. The common region 123 may be accessed or used by one or more of the host device control unit 110 and a storage device control unit 420 of a data storage device 200. In other words, the common region 123 may be shared by the host device control unit 110 and the storage device control unit 420. In some cases, the common region 123 may be accessed or used only by the storage device control unit 420.

The size of the common region 123 may be fixed or variable. The host device control unit 110 may set a part of the memory region as the common region 123 in the host memory 120. The host device control unit 110 may provide the size information or address information of the common region 123 to the data storage device 200 through, for example, a host interface HIF of the data storage device 200.

The data storage device 200 may store data to be accessed by the host device 100. The data storage device 200 may also be referred to as a memory system.

The data storage device 200 may be manufactured as any one of various storage devices suitable for coupling with the host device 100 via a host interface HIF transmission protocol. For example, the data storage device 200 may be configured as any one of various storage devices, such as, for example, a solid state drive, a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, a memory stick, and the like.

The data storage device 200 may be manufactured as any one various packages, such as, for example, a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 200 may include a nonvolatile memory device 300 and a controller 400 operatively coupled to each other.

The nonvolatile memory device 300 may be used as the storage medium of the data storage device 200. The nonvolatile memory device 300 may be configured by any one of various nonvolatile memory devices, such as, for example, a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, and a resistive random access memory (RERAM) using a transition metal oxide. The ferroelectric random access memory (FRAM), the magnetic random access memory (MRAM), the phase change random access memory (PCRAM) and the resistive random access memory (RERAM) are examples of nonvolatile random access memory devices capable of random access to memory cells. In an embodiment, the nonvolatile memory device 300 may be configured by a combination of a NAND flash memory device and any of the above-described nonvolatile random access memory devices.

The nonvolatile memory device 300 may include a memory cell region 310 which includes a buffer region 311 and a main region 313. Each of the buffer and the main regions 311 and 313 may include a plurality of memory cells.

Each of the memory cells may be configured by a single level cell (SLC) capable of storing 1-bit data. The single level cell (SLC) may be erased to have a threshold voltage of an erase state or may be programmed to have a threshold voltage corresponding to one program state.

Each of the memory cells may be configured by a multi-level cell (MLC) capable of storing multi-bit data. The multi-level cell (MLC) may be erased to have a threshold voltage of an erase state or may be programmed to have a threshold voltage corresponding to any one among a plurality of program states.

In an embodiment, storage capacity of each memory cell included in the buffer region 311 may be smaller than the storage capacity of each memory cell included in the main region 313. For instance, each of the memory cells included in the buffer region 311 may store 1-bit data, whereas each of the memory cells included in the main region 313 may store multi-bit data, such as 2-bit or 3-bit data. For another example, each of the memory cells included in the buffer region 311 may store 2-bit data, and each of the memory cells included in the main region 313 may store 3-bit data. For the different storage capacities between the memory cells of the buffer region 311 and the main region 313, the buffer region 311 and the main region 313 may be configured by different types of memory devices. For example, the buffer region 311 may be configured by an SLC memory device, and the main region 313 may be configured by an MLC memory device.

By employing memory cells in the buffer region 311 having a smaller storage capacity than that of the memory cells included in the main region 313, the program speed of the memory cells included in the buffer region 311 may be faster than the program speed of the memory cells included in the main region 313.

Figure 2:
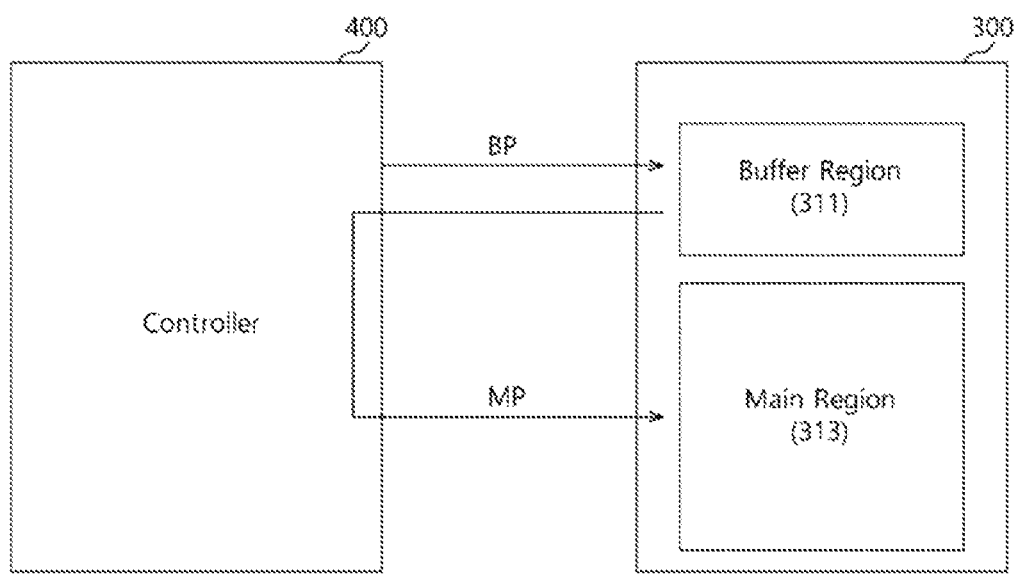
FIG. 2 is a diagram illustrating a buffer program and a main program operation of the data processing system of FIG. 1, according to an embodiment of the present invention.

As shown in FIG. 2, the controller 400 may perform a buffer program operation (denoted with "BP" in FIG. 2) to the buffer region 311 by storing write data provided with a program command from the host device 100 in the buffer region 311 while the controller 400 may perform a main program operation (denoted with "MP" in FIG. 2) to the main region 313 by moving data from the buffer region 311 to the main region 313. The buffer program operation may be faster than the main program operation due to difference in the program speed of the memory cells between the buffer region 311 and the main region 313.

Upon completion of the buffer program operation to the buffer region 311 in response to a program command, the controller 400 may then report the completion of the program operation to the host device 100 as a response to the program request (also referred to as a write request). After transmitting the response to the write request of the host device 100, the controller 400 may perform the main program operation to the main region 313 by reading the write data from the buffer region 311 and programming the write data in the main region 313. For example, the controller 400 may perform the main program operation by moving (reading data from the buffer region 311 and writing the read data into the main region 313) the write data from the buffer region 311 to the main region 313 during an idle time in which there is no request from the host device 100. This scheme, i.e., storing the write data in the nonvolatile memory device 300 through the buffer and the main program operations, allows processing the write request of the host device 100 more quickly since the host device 100 receives the report of the completion of the program operation upon completion of the buffer program operation to the buffer region 311, the program speed of which is faster than the main region 313, and the main program operation may be performed during an idle period. Hence the aforementioned architecture and scheme allow a more efficient use of the data storage device and faster processing.

The controller 400 may include a host interface unit 410, the storage device control unit 420, a storage device volatile memory 430, and a memory control unit 440 operatively coupled to one another, for example, via an internal bus CIB. For the sake of convenience in explanation, the storage device volatile memory 430 will be referred to as a "storage device memory 430."

The host interface unit 410 may interface the host device 100 and the data storage device 200. For example, the host interface unit 410 may communicate with the host device 100 by using any one among standard transmission protocols, such as, for example, universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI) and PCI express (PCI-E) protocols.

The storage device control unit 420 may control one or more of the general operations of the controller 400. The storage device control unit 420 may control all of the general operations of the controller 400. For example, the storage device control unit 420 may drive an instruction, such as an algorithm, for example, of a code type, e.g., a software, loaded in the storage device memory 430, and may control operations of function blocks in the controller 400. The storage device control unit 420 may analyze and process a request of the host device 100 transmitted through the host interface unit 410. The storage device control unit 420 may be configured by a micro control unit (MCU) or a central processing unit (CPU).

The storage device memory 430 may be dedicated to the storage device control unit 420 meaning that it may be accessible only by the storage device control unit 420. The storage device memory 430 may be configured by a random access memory, such as, for example, a DRAM or an SRAM.

The storage device memory 430 may operate as the working memory of the storage device control unit 420. For example, the storage device memory 430 may store a software to be driven by the storage device control unit 420. Also, the storage device memory 430 may store data necessary for driving the software.

The storage device memory 430 may operate as a data buffer memory or a data cache memory. For example, the storage device memory 430 may temporarily store data to be transmitted from the host device 100 to the nonvolatile memory device 300 or from the nonvolatile memory device 300 to the host device 100.

The memory control unit 440 may control the nonvolatile memory device 300 according to the supervisory control of the storage device control unit 420. For example, the memory control unit 440 may generate control signals for controlling the operation of the nonvolatile memory device 300. The control signals may include, for example, commands, addresses, clock signals and the like. The memory control unit 440 may transmit the generated control signals to the nonvolatile memory device 300 via one or more communication channels CCH1. The memory control unit 440 may also be referred to as a memory interface unit.

Figure 3:
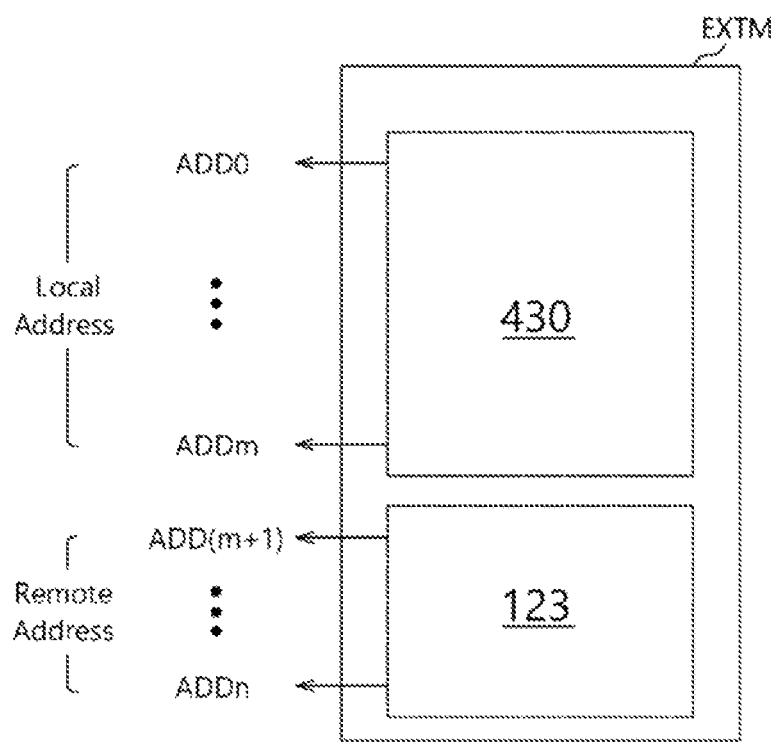
FIG. 3 is a diagram illustrating an extended storage device memory according to an embodiment of the present invention.

Referring now to FIG. 3 an extended storage device memory is provided, according to an embodiment of the present invention.

As described above, the common region 123 may be a sharable memory region for the host device control unit 110 and the storage device control unit 420 which is accessible by either one the control units 110 and 420. For example, the common region 123 may serve as an extended memory region for the storage device memory 430.

The storage device control unit 420 may recognize the memory region of the storage device memory 430 as dedicated thereto, and allocate local addresses ADD0 to ADDm for accessing the storage device memory 430 according to the size of the storage device memory 430.

In addition, the storage device control unit 420 may recognize the common region 123 as an extended memory region and may allocate remote addresses ADD(m+1) to ADDn for accessing the common region 123 according to the size of the common region 123.

The storage device control unit 420 may use the storage device memory 430 and the common region 123 as a single memory region through sequential allocation of the local addresses ADD0 to ADDm and the remote addresses ADD (m+1) to ADDn. That is to say, the storage device control unit 420 may recognize a combination of the storage device memory 430 and the common region 123 as an extended memory EXTM.

The storage device control unit 420 may use the common region 123 as a data buffer memory when there is a data write request along with write-requested data from the host device control unit 110. In other words, the storage device control unit 420 may buffer the write-requested data in the common region 123. The storage device control unit 420 may request the host device control unit 110 to buffer the write-requested data in the common region 123, move the buffered data stored of the common region 123 into the buffer region 311 of the data storage device 200, and store the moved data of the buffer region 311 in the main region 313 of the data storage device 200. The use of the common region 123 as the data buffer memory for the storage device control unit 420 will be described later in detail.

Figure 4:
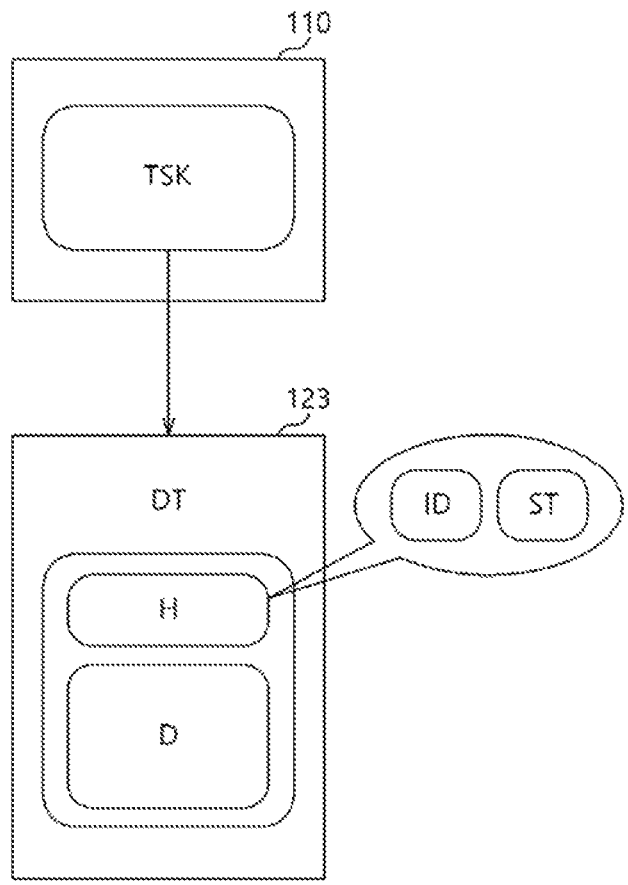
FIG. 4 is a diagram illustrating an example of data generation of a host device, according to an embodiment of the present invention.
Figure 5:
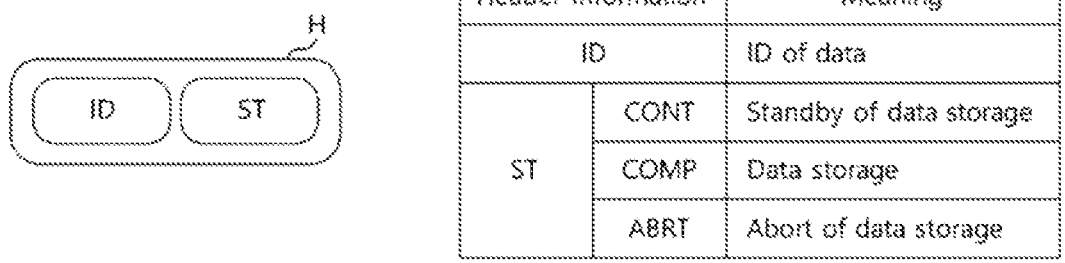
FIG. 5 is a diagram illustrating an example of a header information of data stored in a common region, according to an embodiment of the present invention.

FIG. 4 illustrates an example of a data generation of the host device 110, according to an embodiment of the present invention. FIG. 5 illustrates an example of a header information for the write-requested data stored in the common region 123.

A software loaded in the dedicated region 121 of the host memory 120 may be driven by the host device control unit 110. The software may be driven by a task TSK of the host device control unit 110 suitable for resource allocation. The host device control unit 110 and the task TSK driven by the host device control unit 110 may be regarded as the same in the following descriptions.

The task TSK may operate in response to a user input and generate data D. The task TSK may add a header information H to the data D. In the case where data DT including the data D and the header information H is to be stored in the data storage device 200, the task TSK (or, the host device control unit 110) may buffer the data DT in the common region 123 of the host device memory 120 of the host device 100 in response to the request of the storage device control unit 420 of the controller 400 of the data storage device 200. As described above, when the program command for the write-requested data is provided from the host device 100 which are intended to be stored in the nonvolatile memory device 300 of the data storage device (i.e. data DT), the storage device control unit 420 may request the host device control unit 110 to buffer the write-requested data in the common region 123.

The task TSK may add an identification information ID indicating the task TSK itself to the data D as the header information H. The task. TSK may generate a number of data D during its operation. In this case, the task TSK may add the identification information ID to a number of generated data D in order to indicate by which task. TSK the number of data D are generated. Namely, a plurality of data D having the same identification information ID are determined as generated by a single task TSK identified by the identification information ID.

The task TSK may also add a state information ST to the data D as the header information H. As shown in FIG. 5, the state information ST may include an information regarding storage of data.

As an example of the state information. ST shown in FIG. 5, a state information CONT may represent that the corresponding data D is not ready to be stored in the nonvolatile memory device 300 since the corresponding data D is in ongoing generation (e.g., continuous update of the data D) by the task TSK. For example, when a plurality of data are to be stored as a whole in the nonvolatile memory device 300 and the data D is currently generated as one of the plural data in ongoing generation, the data D may not be ready to be stored in the nonvolatile memory device 300 and thus may have the state information CONT. Therefore, storage of the data D with the state information CONT may be on standby until the generation of the data D is completed by the task TSK.

As another example of the state information ST shown in FIG. 5, a state information COMP may represent that the corresponding data D is ready to be stored in the nonvolatile memory device 300 since the corresponding data D is not in ongoing generation by the task TSK. For example, when a plurality of data are to be stored as a whole in the nonvolatile memory device 300 and the plural data is completed generated by the current generation of the data D as one of the plural data, the data D may be ready to be stored in the nonvolatile memory device 300 and thus may have the state information COMP. In this case, the currently generated data D having the state information COMP and the remaining one having the same identification information ID as the currently generated data D among the plural data may be ready to be stored in the nonvolatile memory device 300.

As another example of the state information ST shown in FIG. 5, a state information ABRT may represent that generation of the corresponding data D is aborted and the corresponding data D is not to be stored in the nonvolatile memory device 300. For example, when a plurality of data are to be stored as a whole in the nonvolatile memory device 300 and the current generation of the data D as one of the plural data is aborted the data D may not be stored in the nonvolatile memory device 300 and thus may have the state, information ABRT. In this case, the currently generated data D having the state information ABRT and the remaining data having the same identification information ID as the currently generated data D among the plural data may not be stored in the nonvolatile memory device 300.

Figure 6:
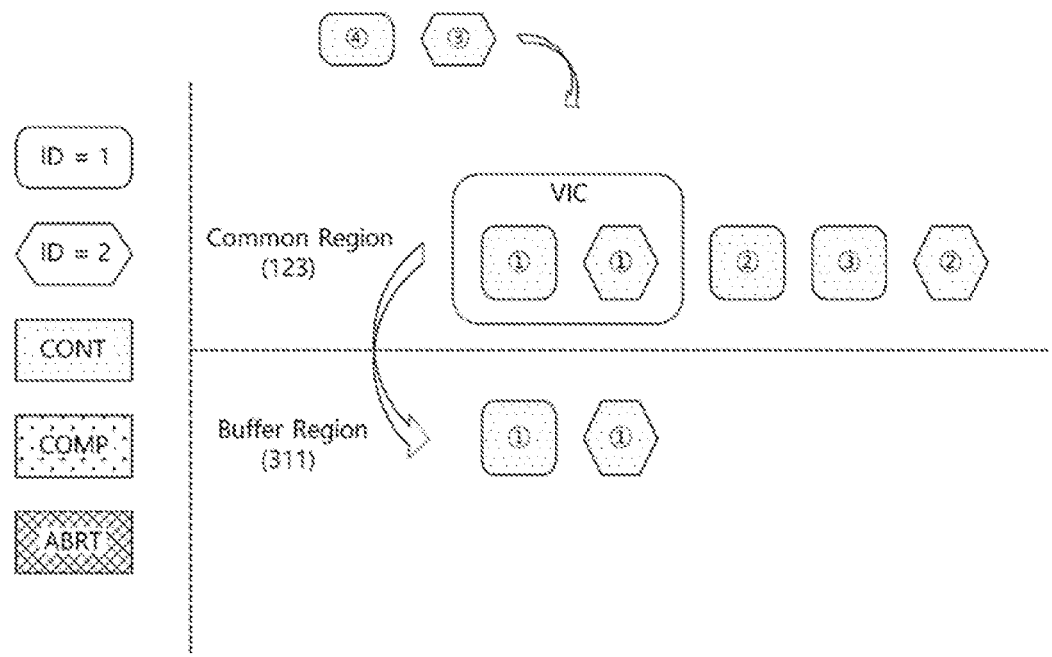
FIGS. 6 to 8 are schematic illustrations of a data storing method of the data processing system, according to an embodiment of the present invention.

FIG. 6 illustrates an example of a data storing method of the data processing system 200, according to an embodiment of the present invention. FIG. 6 shows the buffer program operation BP of the storage device control unit 420 which moves data buffered in the common region 123 into the buffer region 311. It is assumed that the common region 123 is capable of storing five data.

As exemplified in FIG. 6, data enveloped with a rectangle is generated by a first task, having an identification information ID of a value of "1," and data enveloped with a hexagon is generated by a second task, having an identification ID of a value of "2," Also, as exemplified in FIG. 6, each data may include a state information, for example, one of a CONT, COMP and ABRT, which are illustrated using different patterns. These legends are also applied to the following FIGS. 7 to 9.

It is assumed, as an example for illustration purposes, that a plurality of data including data $\hat{1}$, $\hat{2}$ and $\hat{2}$ (enveloped with a rectangle in FIG. 6) generated by the first task are to be stored as a whole in the nonvolatile memory device 300 and a plurality of data including data $\hat{1}$ and $\hat{2}$ (enveloped with a hexagon in FIG. 6) generated by the second task are also to be stored as a whole in the nonvolatile memory device 300. Under this assumption, the data $\hat{3}$ generated by the first task may have the state information CONT, and the data $\hat{2}$ generated by the second task may also have the state information CONT. Also, according to this example, the storage device control unit 420 may request the first task and the second task (that is, the host device control unit 110) to store the data in the common region 123. In response to the request from the storage device control unit 420, the first task may store the data $\hat{1}$, $\hat{2}$ and $\hat{3}$ having the value "1" for the identification information. ID in the common region 123, and the second task may store the data $\hat{1}$ and $\hat{1}$ having the value "2" for the identification information ID in the common region 123.

According to the assumed storage capacity of the common region 123, the common region 123 will be full with the data $\hat{1}$, $\hat{2}$ and $\hat{3}$ generated by the first task and the data $\hat{1}$ and $\hat{2}$ generated by the second task. In this case, when another data $\hat{4}$ generated by the first task and another data $\hat{3}$ generated by the second task are to be buffered in the common region 123 the storage device control unit 420 may perform the buffer program operation to the buffer region 311 by storing buffered data of the common region 123 in the buffer region 311 in order to make storage space for the data $\hat{4}$ generated by the first task and the data $\hat{3}$ generated by the second task in the common region 123.

To this end, the storage device control unit 420 may select as victim data VIC the buffered data with the state information CONT in the common region 123, for example, the data $\hat{1}$ having the value "1" for the identification information ID and the data $\hat{1}$ having the value "2" for the identification information ID. Through the buffer program operation, the storage device control unit 420 may read out the data $\hat{1}$ having the value "1" for the identification information ID and the data $\hat{1}$ having the value "2" for the identification information ID from the common region 123, and store the read-out data in the buffer region 311. Further, the storage device control unit 420 may request the first task and the second task (that is, the host device control unit 110) to store the data $\hat{4}$ having the value "1" for the identification information ID and the data $\hat{3}$ having the value "2" for the identification information ID in the common region 123.

Therefore, in the case where the common region 123 is full with data generated by the task, the storage device control unit 420 may perform the buffer program operation to the common region 123 and the buffer region 311 with the buffered data having the state information CONT in order to make storage space in the common region 123 for another data generated by the task.

Figure 7:
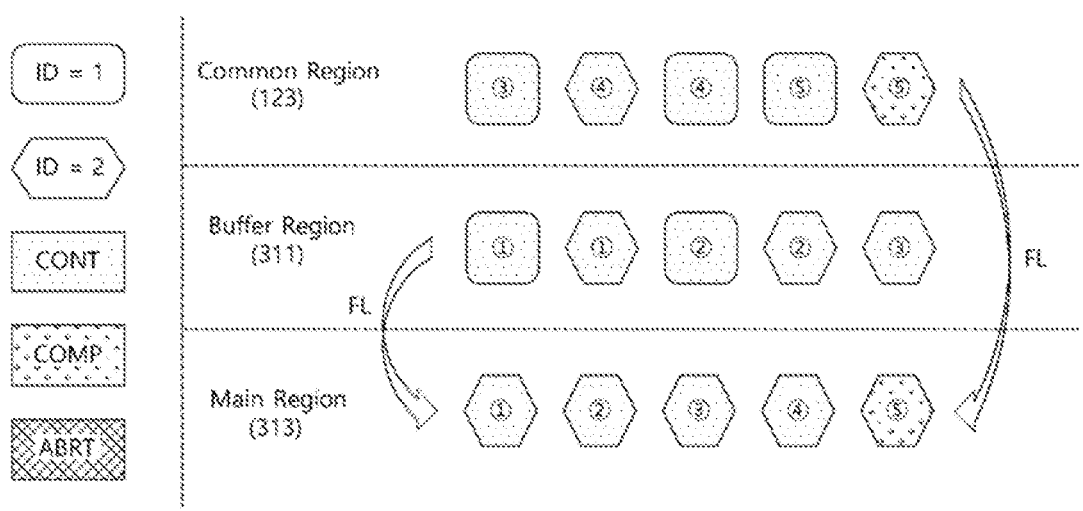

FIG. 7 is an example of a data storing method of the data processing system 200, according to an embodiment of the invention. FIG. 7 shows the main program operation MP of the storage device control unit 420 which moves the data buffered in the common region 123 and the data stored in the buffer region 311 into the main region 313. It is assumed, as an example, for illustration purposes, that data $\hat{1}$ and $\hat{2}$ generated by the first task and data $\hat{1}$, $\hat{2}$ and $\hat{3}$ generated by the second task are stored in the buffer region 311.

It is assumed that a plurality of data including data $\hat{1}$ to $\hat{1}$ (enveloped with a rectangle in FIG. 7) generated by the first task are to be stored as a whole in the nonvolatile memory device 300 and a plurality of data $\hat{1}$ to $\hat{5}$ (enveloped with a hexagon in FIG. 7) generated by the second task are also to be stored as a whole in the nonvolatile memory device 300. Under this assumption, the data $\hat{5}$ generated by the first task may have the state information CONT while the data $\hat{5}$ generated by the second task may have the state information COMP. Also, under this assumed situation, the storage device control unit 420 may request the first task and the second task (that is, the host device control unit 110) to store the data in the common region 123. In response to the request from the storage device control unit 420, the first task may store the data $\hat{3}$ to $\hat{5}$ having the value "1" for the identification information ID in the common region 123, and the second task may store the data $\hat{4}$ and $\hat{5}$ having the value "2" for the identification information. ID in the common region 123.

In this case, since the data $\hat{5}$ generated by the second task has the state information COMP, the plurality of data $\hat{1}$ to $\hat{5}$ generated by the second task are ready to be stored as a whole in the nonvolatile memory device 300.

As the data $\hat{5}$ having the value "2" for the identification information ID and the state information COMP, the storage device control unit 420 may determine that generation of the plurality of data $\hat{1}$ to $\hat{5}$ by the second task is completed. In order to store the data $\hat{1}$ to $\hat{5}$ generated by the second task in the nonvolatile memory device 300, the storage device control unit 420 may perform the main program of flushing (indicated by the reference symbol FL in FIG. 7) the data $\hat{5}$ having the value "2" for the identification information ID and the state information COMP from the common region 123 to the main region 313, and may perform the main program of flushing the data $\hat{1}$ to $\hat{4}$ also having the value "2" of the identification information ID from the common region 123 and the buffer region 311 to the main region 313.

That is to say, the storage device control unit 420 may read out the data $\hat{1}$, $\hat{2}$ and $\hat{3}$ having the value "2" for the identification information ID from the buffer region 311 and read out the data $\hat{4}$ and $\hat{5}$ having the value "2" for the identification information ID from the common region 123. The storage device control unit 420 may store all the read-out data in the main region 313.

Through this operation, when a data having the state information COMP is stored in the common region 123, all data having the same identification information ID as the data having the state information COMP may be moved from the common region 123 and the buffer region 311 to the main region 313.

Figure 8:
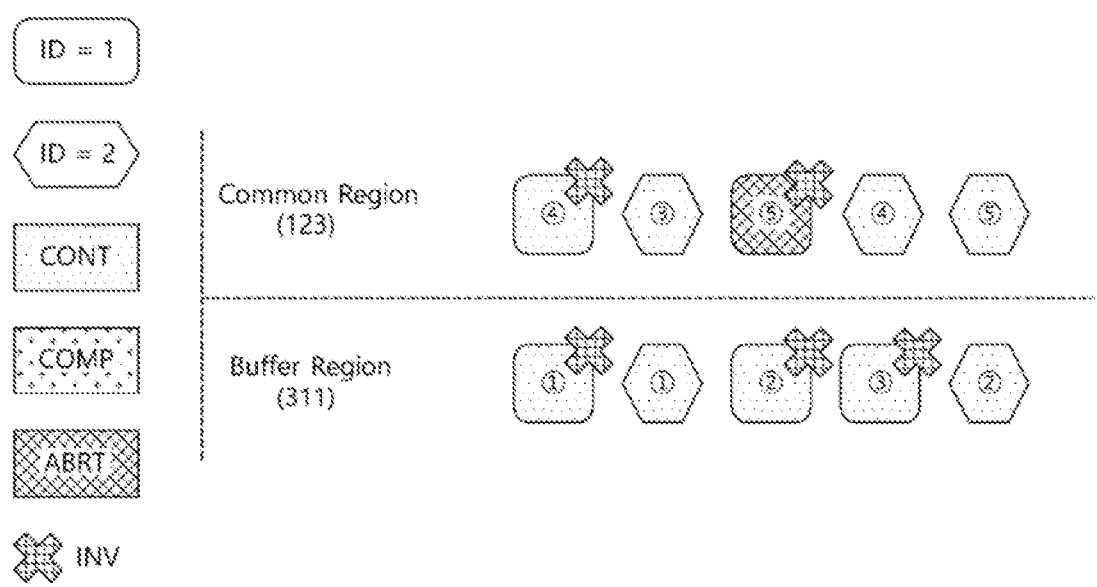

FIG. 8 illustrates a data storing method of the data processing system 200 according to an embodiment of the invention. FIG. 8 shows an invalidation operation of the storage device control unit 420 which invalidates data having the state information ABRT. It is assumed that data $\hat{1}$, $\hat{2}$ and $\hat{3}$ generated by the first task and data $\hat{1}$ and $\hat{2}$ generated by the second task are stored in the buffer region 311.

It is assumed that a plurality of data including data $\hat{1}$ to $\hat{5}$ (enveloped with a rectangle in FIG. 8) generated by the first task are to be stored as a whole in the nonvolatile memory device 300 and a plurality of data including data $\hat{1}$ to $\hat{5}$ (enveloped with a hexagon in FIG. 8) generated by the second task are also to be stored as a whole in the nonvolatile memory device 300. Also, it is assumed that the data $\hat{1}$ to $\hat{5}$ (enveloped with a rectangle in FIG. 8) generated by the first task are to be invalidated. Under this assumption, the data $\hat{5}$ generated by the first task may have the state information ABRT while the data $\hat{5}$ generated by the second task may have the state information CONT. Also, under this assumed situation, the storage device control unit 420 may request the first task and the second task (that is, the host device control unit 110) to store the data in the common region 123. In response to the request from the storage device control unit 420, the first task may store the data $\hat{4}$ and $\hat{5}$ having the value "1" for the identification information ID in the common region 123, and the second task may store the data $\hat{3}$ to $\hat{5}$ having the value "2" for the identification information ID in the common region 123.

In this case, since the data $\hat{5}$ generated by the first task has the state information ABRT, the plurality of data $\hat{1}$ to $\hat{5}$ generated by the first task are to be invalidated.

As the data $\hat{5}$ having the value "1" for the identification information ID and the state information ABRT, the storage device control unit 420 may determine that generation of the plurality of data including the data $\hat{1}$ to $\hat{5}$ by the first task is aborted. In order to avoid storing the data $\hat{1}$ to $\hat{5}$ generated by the first task in the nonvolatile memory device 300, the storage device control unit 420 may invalidate (indicated by the reference symbol INV in FIG. 8), the data $\hat{5}$ having the value "1" for the identification information ID and the state information ABRT and may also invalidate the data $\hat{1}, \hat{2}, \hat{3}$ and $\hat{4}$ also having the value "1" of the identification information ID. In other words, the storage device control unit 420 may invalidate all the data $\hat{1}$ to $\hat{5}$, having the same identification information ID when at least one of them has the state information ABRT.

Through this operation, when a data having the state information ABRT is stored in the common region 123, all data having the same identification information ID as the data having the state information ABRT may be invalidated.

Figure 9:
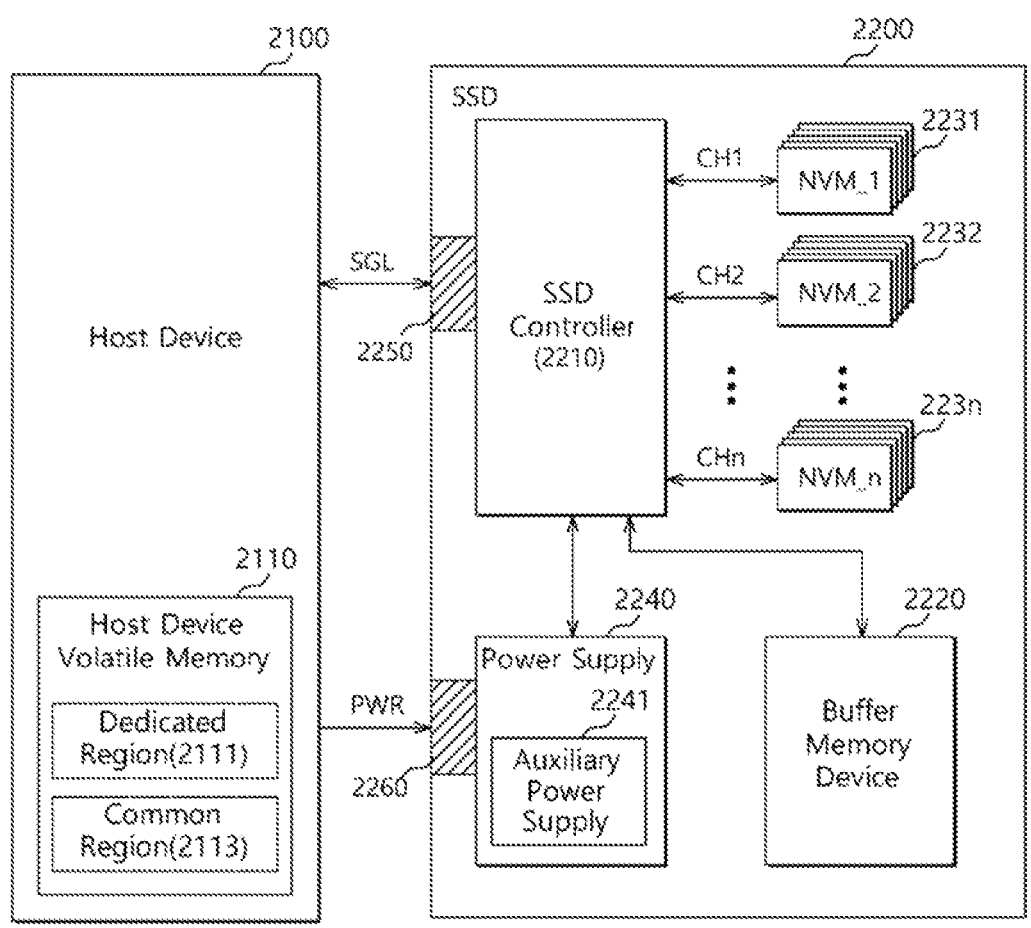
FIG. 9 is a block diagram of a data processing system including a solid state drive (SSD), according to an embodiment of the present invention.

FIG. 9 is a block diagram illustrating a data processing system 2000 having a solid state drive (SSD) 2200 according to an embodiment of the present invention. Referring to FIG. 9, the data processing system 2000 may also include a host device 2100 operatively coupled to the solid state drive (SSD) 2200.

The host device 2100 may include a volatile memory 2110 which is divided into a dedicated region 2111 and a common region 2113. The common region 2113 may be a memory region which may be accessed or used by the host device 2100 and the SSD 2200. That is to say, the common region 2113 may be a memory region for which an authority to use is afforded to both the host device 2100 and the SSD 2200. As the authority to use is shared, the common region 2113 may be recognized and used as a volatile memory device (see the reference numeral 2215 of FIG. 10) of the SSD 2200 or an extended memory region of a buffer memory device 2220. The dedicated region 2111 may be accessed only by the host device 2100.

The SSD 2200 may include an SSD controller 2210, the buffer memory device 2220, nonvolatile memory devices 2231 to 223n, a power supply 2240, a signal connector 2250, and a power connector 2260.

The SSD 2200 may operate in response to a request of the host device 2100. In other words, the SSD controller 2210 may access the nonvolatile memory devices 2231 to 223n in response to a request from the host device 2100. For example, the SSD controller 2210 may control read, program and erase operations of the nonvolatile memory devices 2231 to 223n. Also, the SSD controller 2210 may use the common region 2113 of the host device 2100 as the data buffer memory according to the embodiment described above with reference to FIGS. 6 to 8. Accordingly, the operating speed of the SSD 2200 may be improved.

The buffer memory device 2220 may temporarily store data to be stored in the nonvolatile memory devices 2231 to 223n. Further, the buffer memory device 2220 may temporarily store data read out from the nonvolatile memory devices 2231 to 223n. The data temporarily stored in the buffer memory device 2220 may be transmitted to the host device 2100 or the nonvolatile memory devices 2231 to 223n under control of the SSD controller 2210.

The nonvolatile memory devices 2231 to 223n may be used as storage media of the SSD 2200. The nonvolatile memory devices 2231 to 223n may be coupled with the SSD controller 2210 through a plurality of channels CH1 to CHn, respectively. One or more nonvolatile memory devices may be coupled to one channel. The nonvolatile memory devices coupled to each channel may be coupled to the same signal bus and data bus.

The power supply 2240 may provide power PWR inputted through the power connector 2260, to the inside of the SSD 2200. The power supply 2240 may include an auxiliary power supply 2241. The auxiliary power supply 2241 may be configured to supply power to allow the SSD 2200 to be normally terminated when a sudden power-off occurs. The auxiliary power supply 2241 may include large capacitance capacitors capable of charging power PWR.

The SSD controller 2210 may exchange a signal SGL with the host device 2100 through the signal connector 2250. The signal SGL may include a command, an address, data, and so forth. The signal connector 2250 may by configured by a connector, such as, for example, of parallel advanced technology attachment (PATA) serial advanced technology attachment (SATA), small computer system interface (SCSI), serial attached SCSI (SAS), peripheral component interconnection (PCI), PCI express (PCI-E and universal flash storage (UFS) protocols, according to an interface scheme between the host device 2100 and the SSD 2200.

Figure 10:
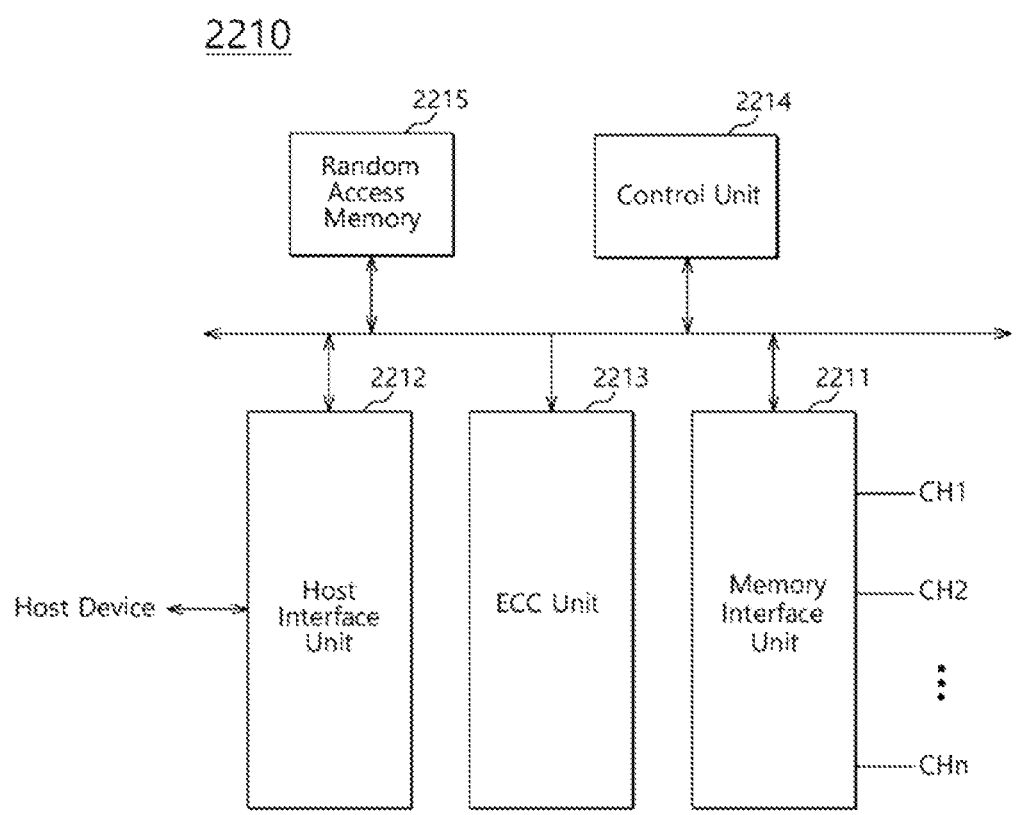
FIG. 10 is a block diagram illustrating a representation of an example of a SSD controller employed in the SSD of FIG. 9, according to an embodiment of the invention.

FIG. 10 illustrates an example of the SSD controller shown in FIG. 9, according to an embodiment of the present invention. Referring to FIG. 10, the SSD controller 2210 may include a memory interface 2211, a host interface 2212, an error correction code (ECC) unit 2213, a micro control unit 2214, and a random access memory 2215 operatively coupled thorough an internal bus 2500.

The memory interface 2211 may provide commands and addresses to the nonvolatile memory devices 2231 to 223n. Moreover, the memory interface 2211 may exchange data with the nonvolatile memory devices 2231 to 223n. The memory interface 2211 may scatter data transmitted from the buffer memory device 2220 to the respective channels CH1 to CHn, under control of the micro control unit 2214. Furthermore, the memory interface 2211 may transmit data read out from the nonvolatile memory devices 2231 to 223n to the buffer memory device 2220, under control of the micro control unit 2214.

The host interface 2212 may be configured to provide interfacing with respect to the SSD 2200 in correspondence to the protocol of the host device 2100. For example, the host interface 2212 may communicate with the host device 2100 through any one of parallel advanced technology attachment (PTA), serial advanced technology attachment (SATA), small computer system interface (SCSI), serial attached SCSI (SAS), peripheral component interconnection (PCI) PCI express (PCP-E) and universal flash storage (UFS) protocols. In addition, the host interface 2212 may perform a disk emulating function of supporting the host device 2100 to recognize the SSD 2200 as a hard disk drive (HDD).

The error correction code (ECC) unit 2213 may generate parity data to be transmitted to the nonvolatile memory devices 2231 to 223n, among data stored in the buffer memory device 2220. The generated parity data may be stored, along with data, in the nonvolatile memory devices 2231 to 223n. The error correction code (ECC) unit 2213 may detect an error of the data read out from the nonvolatile memory devices 2231 to 223n. When the detected error is within a correctable range, the error correction code (ECC) unit 2213 may correct the detected error.

The control unit 2214 may analyze and process the signal SGL inputted from the host device 2100. The control unit 2214 may control operations of the buffer memory device 2220 and the nonvolatile memory devices 2231 to 223n according to a firmware or a software for driving the SSD 2200. The random access memory 2215 may be used as a working memory for driving the firmware or the software.

While various embodiments have been described above, it will be understood to those skilled in the art that the embodiments described are examples only. Accordingly, the data processing system and the operating method thereof described herein should not be limited based on the described embodiments.

What is claimed is:

1. A data processing system comprising:
   a host device including a host volatile memory and a first control unit; and
   a data storage device including a storage volatile memory, a storage nonvolatile memory and a second control unit,
   wherein the host volatile memory includes a common region that is accessed by both the first control unit and the second control unit,
   wherein the first control unit adds a header information to data to be provided to the data storage device, and stores the data with the header information in the common region of the host volatile memory
   wherein, when the common region of the host volatile memory is full with data, the second control unit performs one of a buffer program operation for storing a portion of the data stored in the common region in a buffer region of the storage nonvolatile memory, a main program operation for storing a portion of the data stored in the common region in a main region of the storage nonvolatile memory and an invalidation operation for invalidating a portion of the data stored in the common region, based on the header information of each of the data,
   wherein the header information includes identification information indicating a task that generated the data and state information indicating a generation state of the data,
   wherein the state information includes one selected from a group consisting of a first state information, a second state information and a third state information,
   wherein the first state information indicates that corresponding data is in ongoing generation, the second state information indicates that generation of corresponding data is completed, and the third state information indicates that generation of corresponding data is aborted, and
   wherein, when the common region of the host volatile memory is full with the data, the second control unit selects, from the data stored in the common region of the host volatile memory, one or more data having the first state information and having different identification information from each other, and moves the selected data to the buffer region of the storage nonvolatile memory from the common region of the host volatile memory.

2. The data processing system according to claim 1, wherein, when the common region of the host volatile memory is full with the data, the second control unit selects, from the data stored in each of the common region of the host volatile memory and the buffer region of the storage nonvolatile memory, one or more data having the second state information and having the same identification information, and moves the selected data to the main region of the storage nonvolatile memory from the common region of the host volatile memory and the buffer region of the storage nonvolatile memory.

3. The data processing system according to claim 1, wherein, when the common region of the host volatile memory is full with the data, the second control unit selects, from the data stored in each of the common region of the host volatile memory and the buffer region of the storage nonvolatile memory, one or more data having the third state information and having the same identification information, and invalidates the selected one or more data.

4. The data processing system according to claim 1, wherein the second control unit sequentially allocates addresses for accessing the common region of the host volatile memory and addresses for accessing the storage volatile memory of the data storage device.

5. The data processing system according to claim 1, wherein storage capacity per memory cell of the buffer region of the storage nonvolatile memory is smaller than that of the main region of the storage nonvolatile memory.

6. The data processing system according to claim 1, wherein memory cell schemes between the buffer region of the storage nonvolatile memory and the main region of the storage nonvolatile memory are different from each other.

7. A data processing method for a data processing system comprising a host device including a first control unit and a data storage device including a second control unit, the host device including a host volatile memory having a common region accessed by both the first control unit and the second control unit, and the data storage device including a storage volatile memory and a storage nonvolatile memory, the method comprising:
   adding, by the first control unit, header information to data to be provided to the data storage device;
   storing, by the first control unit, the data with the header information in the common region of the host volatile memory;
   performing, by the second control unit, one of a buffer program operation for storing a portion of the data stored in the common region in a buffer region of the storage nonvolatile memory, a main program operation for storing a portion of the data stored in the common region in a main region of the storage nonvolatile memory and an invalidation operation for invalidating a portion of the data stored in the common region, based on the header information of each of the data,
   wherein the header information includes identification information indicating a task that generated the data and state information indicating a generation state of the data,
   wherein the state information includes one selected from a group consisting of a first state information, a second state information and a third state information,
   wherein the first state information indicates that corresponding data is in ongoing generation, the second state information indicates that generation of corresponding data is completed, and the third state information indicates that generation of corresponding data is aborted, and
   wherein, when the common region of the host volatile memory is full with data selecting, by the second control unit, from the data stored in the common region of the host volatile memory, one or more data having the first state information and having different identification information from each other, and moving the selected data to the buffer region of the storage nonvolatile memory from the common region of the host volatile memory.

8. The data processing system according to claim 7, further comprising, when the common region of the host volatile memory is full with data,
    selecting, by the second control unit, from the data stored in each of the common region of the host volatile memory and the buffer region of the storage nonvolatile memory, one or more data having the second state information and having the same identification information, and
    moving the selected data to the main region of the storage nonvolatile memory from the common region of the host volatile memory and the buffer region of the storage nonvolatile memory.

9. The data processing method according to claim 7, further comprising, when the common region of the host volatile memory is full with the data,
    selecting, by the second control unit, from the data stored in each of the common region of the host volatile memory and the buffer region of the storage nonvolatile memory, one or more data having the third state information and having the same identification information, and
    invalidating the selected one or more data.

10. The data processing method according to claim 7, further comprising:
    sequentially allocating, by the second control unit, addresses for accessing the common region of the host volatile memory and addresses for accessing the storage volatile memory of the data storage device.

11. The data processing method according to claim 7, wherein storage capacity per memory cell of the buffer region of the storage nonvolatile memory is smaller than that of the main region of the storage nonvolatile memory.

12. The data processing method according to claim 7, wherein memory cell schemes between the buffer region of the storage nonvolatile memory and the main region of the storage nonvolatile memory are different from each other.

* * * * *